United States Patent [19]

Siebert

[11] Patent Number: 4,681,299

[45] Date of Patent: Jul. 21, 1987

[54] MOTORCYCLE JACK

[76] Inventor: Louie P. Siebert, P.O. Box 654, Henderson, Nebr. 68371

[21] Appl. No.: 804,501

[22] Filed: Dec. 4, 1985

[51] Int. Cl.[4] .................... B60P 1/48

[52] U.S. Cl. .................... 254/8 R; 254/124

[58] Field of Search .............. 254/8 R, 8 B, 8 C, 9 R, 254/9 B, 9 C, 10 R, 10 B, 10 C, 124; 212/189; 280/763.1, 764.1

[56] References Cited

U.S. PATENT DOCUMENTS

| | | | |
|---|---|---|---|
| 723,692 | 3/1903 | Litsey | 254/8 R |
| 3,559,981 | 2/1971 | Abshear | 254/134 |
| 3,709,518 | 1/1973 | Gauchet | 280/764.1 |
| 3,782,688 | 1/1974 | Scott | 254/124 |

FOREIGN PATENT DOCUMENTS

| | | | |
|---|---|---|---|
| 216700 | 12/1984 | Fed. Rep. of Germany | 254/8 B |
| 2267975 | 11/1975 | France | 254/8 R |

OTHER PUBLICATIONS

Motorcycle Product News/Jul. 1985, includes the following advertisements: p. 91: M/C Lift of Precision Mfg. & Sales Co., p. 94: Bestway Lifts, p. 98: Hand Stand.

Carlson Co. Motorcycle Lifts advertisement.

Machine and Tool Blue Book/Sep. 1985, p. 99: New Wilton Lift Table.

Hercules/Stanley Hydratruck brochure.

*Primary Examiner*—Robert C. Watson

*Attorney, Agent, or Firm*—Zarley, McKee, Thomte, Voorhees & Sease

[57] ABSTRACT

A motorcycle jack includes a frame having front and rear cross shafts rotatably supported thereon. Pairs of front and rear legs are secured to opposite ends of the respective front and rear cross shafts for rotation in unison with the shafts. A linkage mechanism interconnects the front and rear shafts for rotation in unison, but in opposite directions so that the frame is raised in response to pivotal movement of the front and rear legs toward one another and is lowered in response to pivotal movement of the front and rear legs away from one another. A power unit is provided for rotating their legs relative to the frame. The cross shafts are preferably formed of a resilient material so that the free left legs tend to spread slightly further apart than the interconnected right legs, thereby tilting the motorcycle slightly to the left for placement onto its kickstand when the jack is lowered.

10 Claims, 5 Drawing Figures

MOTORCYCLE JACK

BACKGROUND OF THE INVENTION

The present invention is directed generally to a motorcycle jack and more particularly to a small compact jack capable of lifting the whole motorcycle and capable of being moved about with a motorcycle supported thereon.

Motorcycle repair shops generally have one or more permanently installed floor hoists similar to those used for lifting automobiles. The permanent floor hoists, however, are often prohibitively expensive for the occasional user and suffer the further disadvantage of not allowing the raised motorcycle to be temporarily pushed aside while awaiting delivery of parts or available time for the next repair procedure.

Large portable motorcycle jacks are known but these have such shortcomings as being expensive, supporting the motorcycle by its wheels thereby preventing wheel removal; and having vertically extended portions which interfer with access to the raised motorcycle.

Finally, small rigid "pry bar" type stands are available for lifting one wheel of a motorcycle out of ground engagement but these suffer from the dangerous "teeter-totter" effect and the frustrations of one wheel lifting.

Accordingly, a primary object of the invention is to provide an improved motorcycle jack.

Another object is to provide a motorcycle jack which lifts and securely holds the whole bike.

Another object is to provide a motorcycle jack which allows removal of both wheels of the motorcycle at once.

Another object is to provide a motorcycle jack which uses hydraulic power to easily raise and lower even the heaviest of motorcycles.

Another object is to provide a motorcycle jack which can be easily moved about with a motorcycle supported thereon.

Another object is to provide a motorcycle stand designed to safely lower the motorcycle onto its kickstand in the event of failure of the jack.

Finally, an object is to provide a motorcycle jack which is simple and rugged in construction, inexpensive to manufacture and efficient in operation.

SUMMARY OF THE INVENTION

The motorcycle jack of the present invention includes a frame having front and rear cross shafts extended transversely across the frame and rotatably supported thereon. A pair of front legs are secured to opposite ends of the front shaft for rotation therewith and a pair of rear legs are secured to opposite ends of the rear shaft for rotation therewith. The front and rear shafts are operatively interconnected by a mechanism which constrains those shafts to pivotal movement in unison but in opposite directions with the result that the frame is raised in response to pivotal movement of the front and rear legs toward one another and is lowered in response to pivotal movement of the front and rear legs away from one another. A power means such as a hydraulic cylinder unit is provided for pivotally moving the legs relative to the frame. It is preferred that the cross shafts be formed of a resilient material such as spring steel and that the interconnecting mechanism and power means be situated at the right ends of the cross shafts so that the left legs tend to flex apart to a limited extent under the load of a motorcycle, thereby inclining the motorcycle slightly to the left so that it can be safely supported by the lowered kickstand on the left side of the motorcycle when the jack is lowered.

Wheels are provided on the lower ends of the legs so the jack can be easily moved about with a motorcycle supported thereon and caster wheels may be provided on two legs to facilitate movement to any desired position.

The interconnecting mechanism may be a simple rigid link having opposite ends pivotally connected to the front and rear legs at positions above and below the pivot axes thereof.

DESCRIPTION OF THE PREFERRED EMBODIMENT

Figure 1:
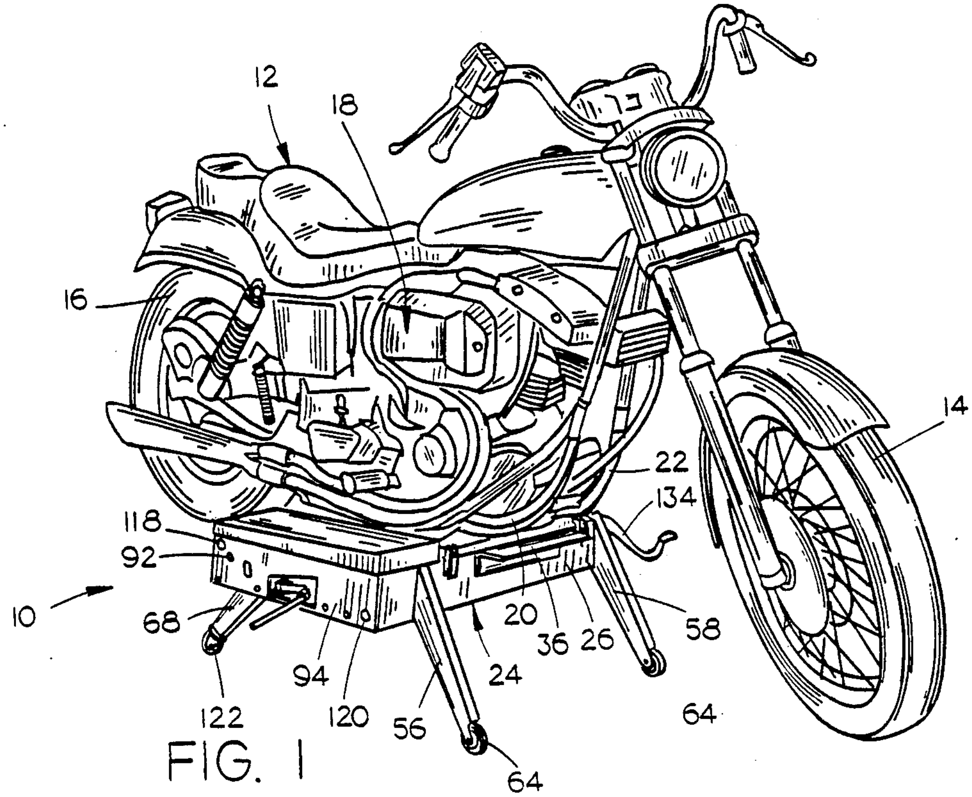
FIG. 1 is a perspective view of a motorcycle supported on the jack of the invention.

The motorcycle jack 10 of the present invention is shown in FIG. 1 supporting an entire motorcycle 12 at a position enabling removal of both the front and rear wheels 14 and 16 at once. The jack is positioned below the engine 18 for direct contact with the motorcycle frame, such as the right and left-hand frame tubes 20 and 22 shown in FIGS. 1 and 5.

Figure 2:
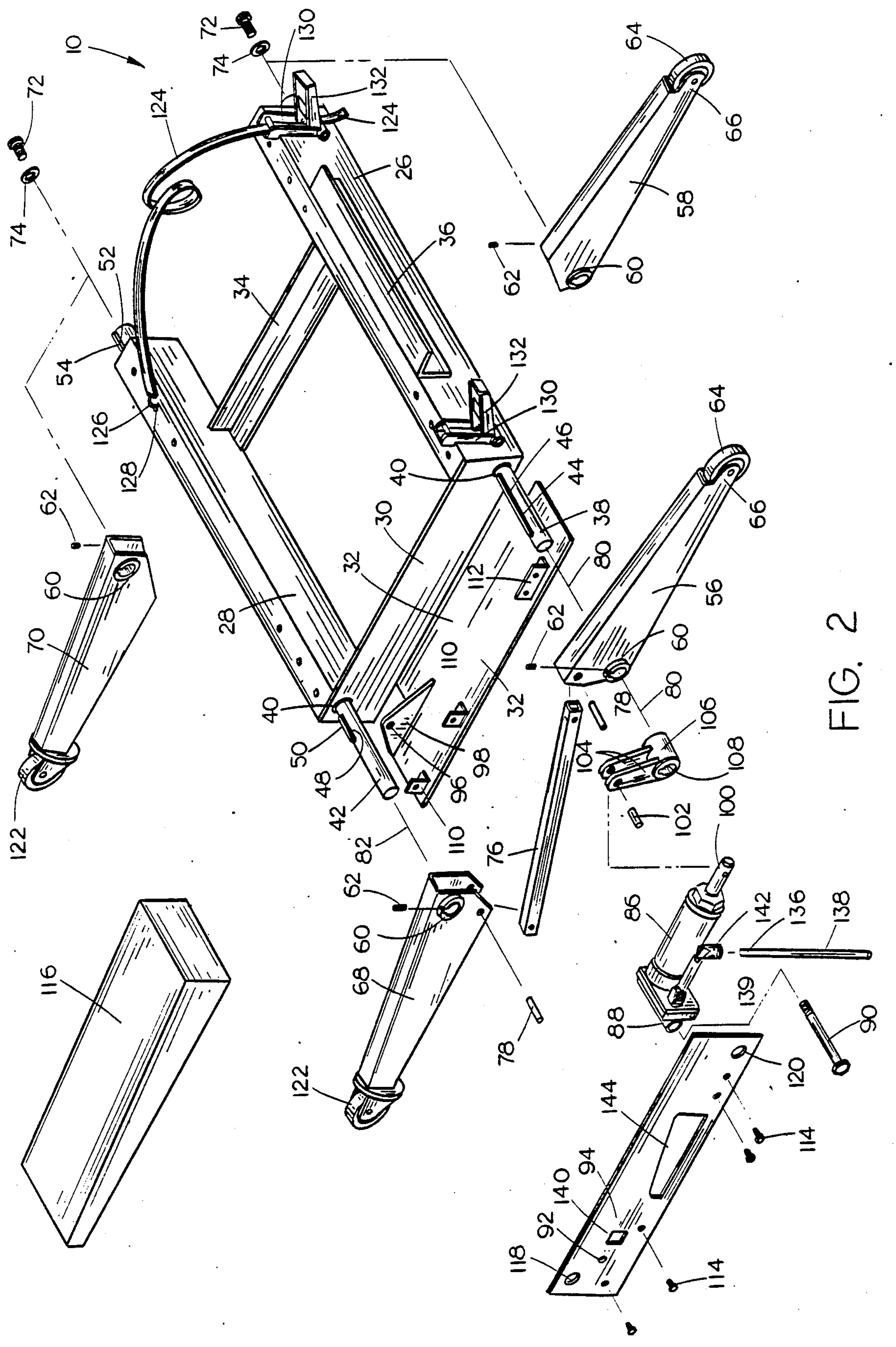
FIG. 2 is an exploded perspective view showing the various parts of the invention.

The structure of the motorcycle jack 10 is shown best in the exploded view of FIG. 2. Jack 10 includes a somewhat A-shaped frame having front and rear frame members 26 and 28, the right ends of which are interconnected by a fixed side plate 30 having a housing bottom wall 32 extended outwardly from the lower edge thereof. An angle brace 34 interconnects the front and rear frame members 26 and 28 at a position spaced from the free left ends thereof. The frame members are preferably formed of rigid steel tubing. The various extension plates such as the angle member 36 on the front frame member 26 in FIG. 2 may be provided to accommodate the support of particular makes of motorcycles on the jack of the invention.

A front cross shaft 38 extends transversely through the front frame member 26 and is rotatably supported in a lower portion thereof by suitable bearing means 40 in the fixed side plate 30 and opposite left end plate, not shown, for the front frame member 26. Likewise, a similar rear cross shaft 42 extends transversely through the rear frame member in a upper portion thereof and is rotatably supported therein by similar bearing means 40.

Both cross shafts are longer than the associated frame members and protrude from both the right and left ends thereof. The front cross shaft 38 includes a long key way and associated key 46 adjacent the right end thereof and a short key way and associated key, not shown, adjacent the left end thereof. Likewise, rear cross shaft 42 includes a short key way 48 and associated key 50 in spaced relation from the right end thereof and another short key way 52 and associated key 54 adjacent the left end thereof.

A pair of front legs 56 and 58 are slidably fit onto the respective right and left ends of the front cross shaft 38. A fitting 60 on each leg causes it to be keyed to the shaft 38 for rotation therewith and each fitting includes a set screw 62 for axially securing the leg on the shaft 38. The front legs 56 and 58 are so constructed that they extend radially from the shaft 38 in parallel relation. The lower end of each front leg 56 and 58 is provided with a wheel 64 rotatably carried between a pair of depending flanges 66.

Likewise, a pair of right and left rear legs 68 and 70 are slidably received on the respective right and left ends of rear cross shaft 42 and these legs are likewise keyed to shaft 42 by fittings 60 which coact with the keys 50 and 54. The rear legs likewise extend radially from rear cross shaft 42 in parallel relation.

To prevent the left legs 58 and 70 from accidentally sliding off of the ends of the cross shafts 38 and 42, the left end of each shaft includes a threaded bore for receiving a bolt 72 and retaining washer 74 of sufficient diameter to prevent axial removal of the legs from the shafts.

Figure 3:
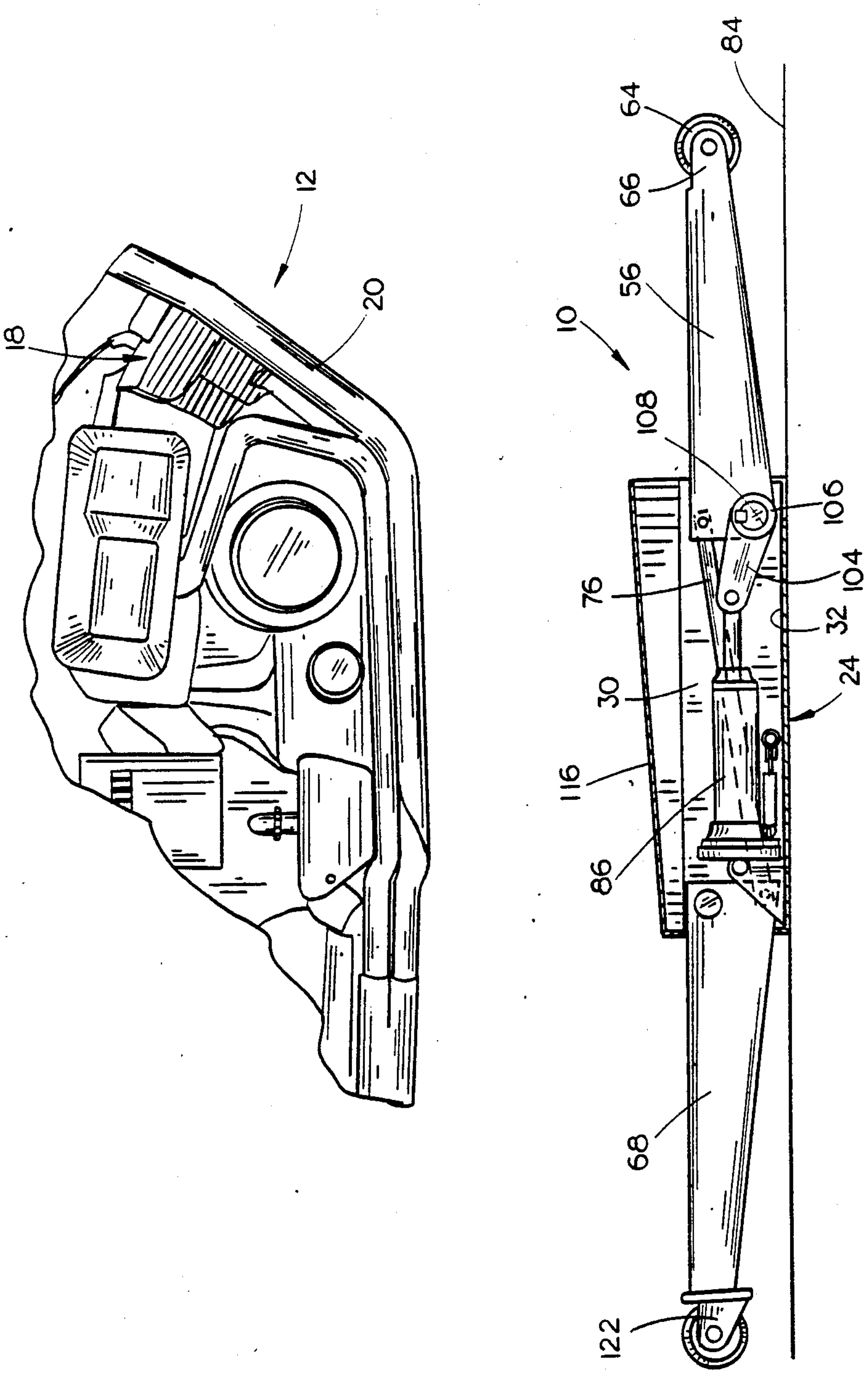
FIG. 3 is a partially sectional side view showing the jack in its lower most position below a motorcycle frame.
Figure 4:
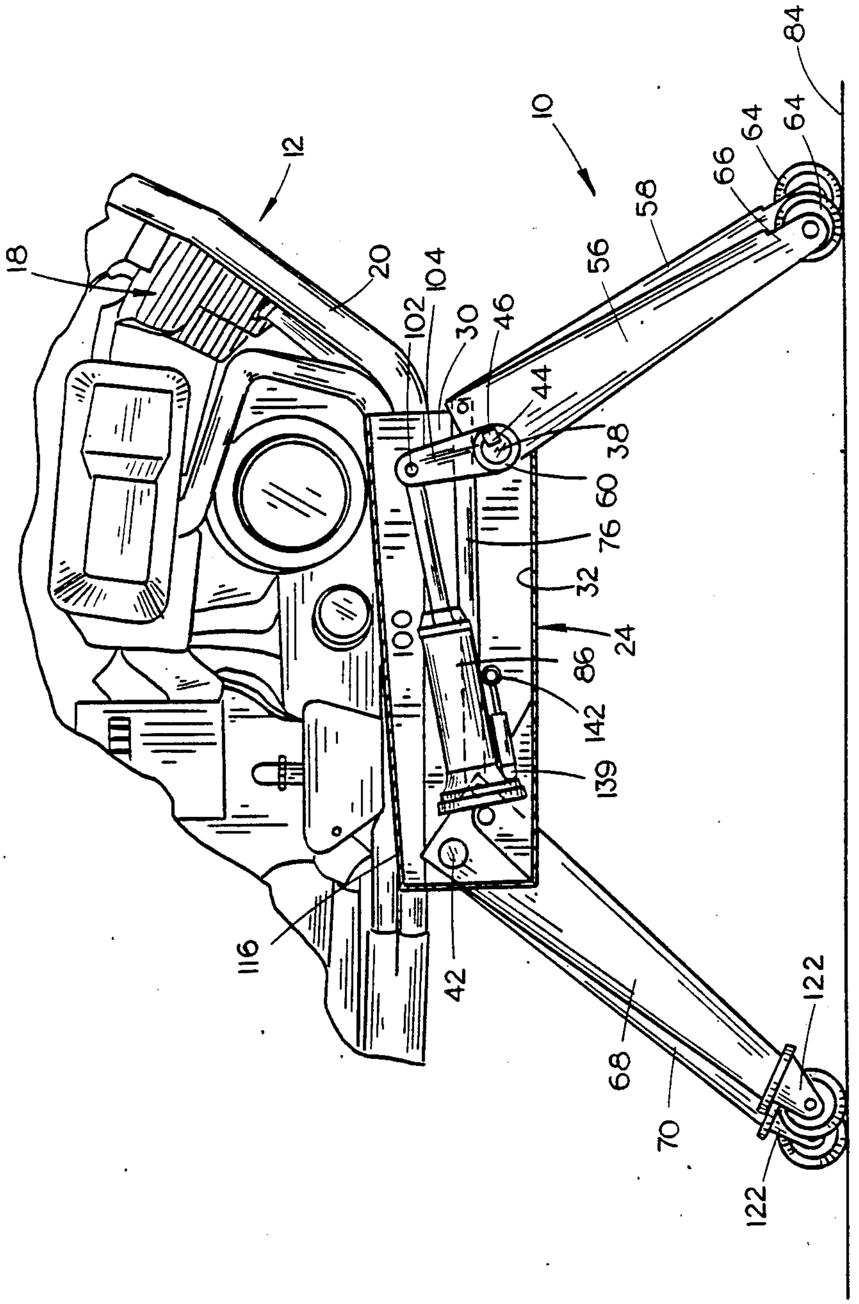
FIG. 4 is a partially sectional side elevational view showing a motorcycle supported on the jack.

An elongated rigid link 76 is pivotally connected at its opposite ends to the upper ends of the right front leg 56 and right rear leg 68 by pins 78 inserted through registered holes in the legs and link, as shown in FIG. 2. Small retaining rings, not shown, are secured to opposite ends of the pins for axially securing them on each leg. It is important that the pivotal connections of the link to the front and rear left legs 56 and 58 are on opposite sides of the pivot axes for those legs. For example, in FIG. 2, it is seen that the link is connected to front right leg 56 at a position above the pivot axis 80 whereas the other end of the link is connected to right rear leg 68 at a position below the pivot axis 82. As a result, the front and rear left legs 58 and 68 are constrained to pivotal movement in unison, but in opposite directions. The extent of pivotal movement of the legs is shown in FIGS. 3 and 4. FIG. 3 shows the lowered position for the jack wherein the legs 56 and 68 can be pivoted upwardly into a substantially horizontal plane with the wheels thereof in clearance relation above the support surface 84. FIG. 4, on the other hand, shows the fully raised position for the jack wherein the front right leg 56 is pivoted downwardly to the extent that the link 76 engages the fitting 60 on the front right leg 56. The forward shifting of the link causes both right legs to pivot downwardly in unison so as to maintain the horizontal posture of the frame as it is raised and lowered.

Referring again to FIG. 2, the power for raising and lowering the jack is provided by the hydraulic cylinder unit 86 which includes a mounting sleeve 88 adapted to be pivotally supported on a bolt 90 which is extended through a hole 92 in removable face plate 94 and hole 96 in bracket 98 on bottom wall 32. The movable piston end 100 of hydraulic cylinder unit 86 is pivotally secured by pin 102 between a pair of upstanding ears 104 of crank 106 having a keyed bore 108 adapted for receiving the long key 46 on the right end of front cross shaft 38.

Assembly of the jack is completed by securing face plate 94 to the respective bottom wall brackets 110 and 112 and by screws 114 and by placement of the housing cover 116 onto side plate 30 and face plate 94. Note that the face plate 94 includes bores 118 and 120 which rotatably receive and support the free right ends of the front and rear cross shafts 38 and 42.

For added mobility of the jack, the lower ends of the right and left rear legs 68 and 70 are provided with caster mounted wheels 122 so that the jack can be turned in addition to being rolled back and forth.

To secure a motorcycle on the portable jack, a pair of tiedown straps 124 are provided. Each strap has a hook 126 at one end for securement in one of the holes 128 in the rear frame member. The opposite plain end of strap 124 is adapted to be engaged within a ratchet mechanism 130 secured onto the front face of front frame member 26, as shown in FIG. 2. It is preferred that the tiedown strap 124 be wraped one complete turn around the foot peg, spill bar or floor board of the motorcycle prior to inserting the free end in the ratchet mechanism. The strap is tightened by using a downward stroke of the ratchet handle 132.

In operation, the jack is positioned squarely beneath the center of the motorcycle with the open left side of the frame toward the motorcycle kickstand 134. The flattened end 136 of the jack handle 138 (FIG. 2) is used to securely close the hydraulic control valve of the cylinder unit 86 which is accessible through face plate opening 140. The handle is then turned end-for-end and fit into the pump lever 142 which is accessible through face plate opening 144. The handle is reciprocated fore and aft until the frame members 26 and 28 are raised to a position just below the motorcycle frame. The position of the jack is then adjusted to assure stable, secure contact points with the motorcycle frame. Once proper platform alignment is established, the handle is slowly pumped until the frame members 26, 28 or adapter 36 contacts the frame. Pumping action is then continued slowly, allowing the motorcycle to raise from its kickstand 134 fully onto the jack 10. After making certain the motorcycle is stable and solidly positioned on the jack, handle 138 is pumped to continue raising the frame to the fully raised position of FIG. 4. The jack handle 138 is then removed and set aside.

In the raised position, one or both wheels of the motorcycle may be removed at the same time since the motorcycle is fully supported on the jack 10. Furthermore, the raised motorcycle can be moved from place to place by simply rolling the jack along the floor on its wheels 64 and 122.

To lower the motorcycle, the flattened end 136 of jack handle 138 is again used to slowly turn the hydraulic control valve 139 counterclockwise to open it. The platform lowers slowly allowing the motorcycle to settle naturally onto its kickstand 134.

Figure 5:
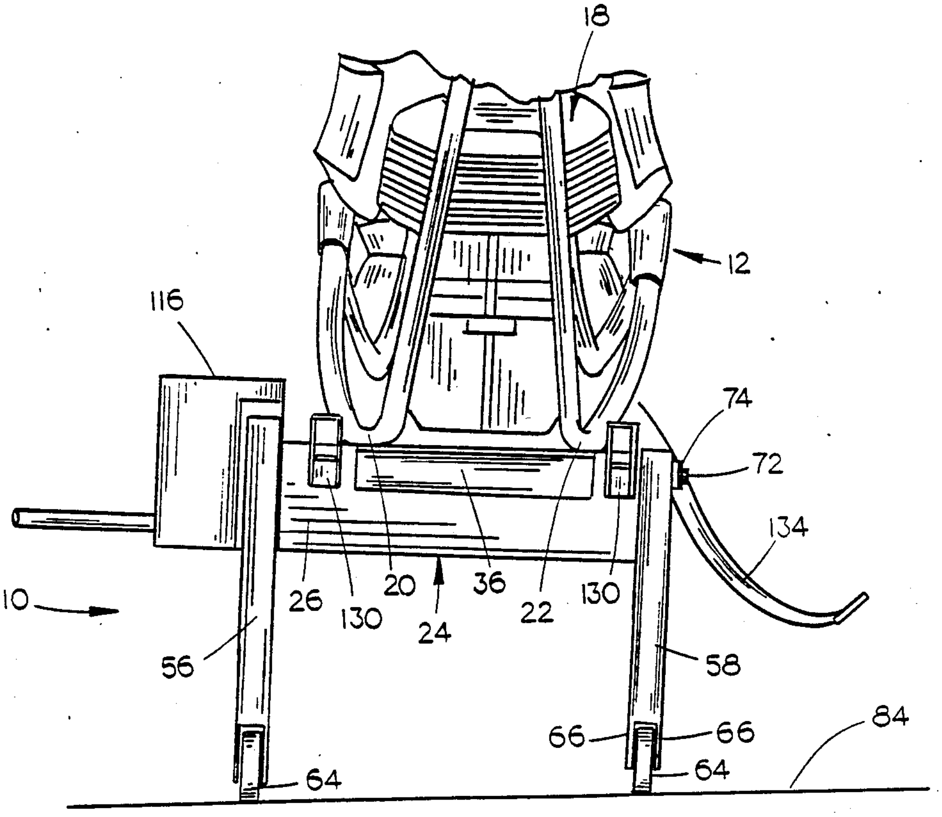
FIG. 5 is an enlarged end view showing a portion of a motorcycle supported on the jack.

An important safety feature of the invention is the resilient nature of the cross shafts 38 and 42 which enables them to substantially fully recover from limited torsional bending. Since the front and rear left legs 58 and 70 are not interconnected by any direct mechanical link, the load of the motorcycle on the downwardly and outwardly inclined left legs causes them to spread slightly further apart than the right legs thereby effecting a slight twisting or torsional bending of the cross shafts 38 and 42. The cross shafts are, therefore, preferably formed of spring steel or a similar strong resilient material. As a result of the flexing of the cross shafts, the left side of the motorcycle is lowered slightly relative to the right side as shown in FIG. 5. "Left side" is used here to refer to the left side of the motorcycle and therefor appears as the right side of the drawing FIG. 5. The resulting leftward inclination of the motorcycle is an important safety feature for two reasons. First, it tips the motorcycle away from the operator so that the motorcycle will not fall onto the operator in the event of failure or accidental lowering of the jack. Secondly, the leftward inclination of the motorcycle causes it to be prepositioned for placement onto its lowered kickstand 134 upon lowering of the jack, thereby eleminating any sudden shifting of the motorcycle which could cause it to topple over.

In the preferred embodiment of the invention, the frame is approximately four inches tall and can be raised to a position approximately 14 inches off the floor. The legs are approximately 12 inches long. The complete jack weighs approximately 80 pounds and is designed to lift motorcycles in excess of 1,000 pounds. A 4 ton hydraulic cylinder unit is standard. During testing, a 2150 pound load on the jack caused the keys to shear which resulted in the motorcycle being let down slowly onto its kickstand.

Whereas the invention has been shown and described in connection with a preferred embodiment thereof, many modifications, substitutions and additions may be made which are within the intended broad scope of the appended claims.

Thus there has been shown and described an improved motorcycle jack which accomplishes at least all of the stated objects.

I claim:

1. A motorcycle jack comprising a frame having longitudinally spaced apart forward and rearward ends and transversely spaced apart right and left sides, a part of front and rear cross shafts extended transversely across said frame and rotatably supported thereon in longitudinally spaced apart relation, a part of front legs having upper end portions mounted on said front cross shaft for rotation therewith, said front legs extending generally radially from said front cross shaft in generally parallel relation to one another, a part of rear legs having upper end portions mounted on said rear cross shaft for rotation therewith, said rear legs extending generally radially from said rear cross shaft in generally parallel relation to one another, means interconnecting at least one front leg and at least one rear leg so that said interconnected front and rear legs are constrained to pivotal movement in unison but in opposite directions, and power means operatively connected to said interconnected legs for pivotally moving said interconnected legs relative to said frame whereby said frame is raised in response to pivotal movement of the lower ends of said interconnected legs toward one another and lowered in response to pivotal movement of the lower ends of said interconnected legs away from one another, said cross shafts being formed of a resilient material capable of substantially complete recovery from limited torsional bending, one front leg being rigidly linked to the rear leg on the same side of the frame, said rigid link having opposite ends pivotally connected to said interconnected front leg and rear leg at positions above and below the pivot axes thereof.

2. The motorcycle jack of claim 1 wherein said cross shafts are formed of spring steel.

3. The motorcycle jack of claim 1 further comprising wheel means on the lower ends of said front and rear legs.

4. The motorcycle jack of claim 3 wherein said wheel means comprises caster mounted wheels.

5. The motorcycle jack of claim 1 wherein said means interconnecting at least one front leg and one rear leg comprises a rigid link having opposite ends pivotally connected respectively to said interconnected front and rear legs at positions above and below the pivot axes thereof.

6. The motorcycle jack of claim 5 wherein said power means and link are positioned adjacent the right ends of said cross shafts.

7. The motorcycle jack of claim 6 wherein said power means comprises an extendable and retractable hydraulic cylinder unit.

8. The motorcycle jack of claim 1 further comprising tie-down strap means on said frame for securing a motorcycle thereon.

9. A motorcycle jack comprising a frame having longitudinally spaced-apart forward and rearward ends and transversely spaced-apart right and left sides, a pair of front and rear cross shafts extended transversely across said frame and rotatably supported thereon in longitudinally spaced-apart relation, said front and rear cross shafts being supported in vertically separate, generally horizontal, planes, a pair of front legs having upper end portions mounted on said front cross shaft for rotation therewith, said front legs extending generally radially from said front cross shaft in generally parallel relation to one another, a pair of rear legs having upper end portions mounted on said rear cross shaft for rotation therewith, said rear legs extending generally radially from said rear cross shaft in generally parallel relation to one another, means interconnecting at least one front leg and at least one rear leg so that said interconnected front and rear legs are constrained to pivotal movement in unison but in opposite directions, and power means operatively connected to said interconnected legs for pivotally moving said interconnected legs relative to said frame whereby said frame is raised in response to pivotal movement of the lower ends of said interconnected legs toward one another and lowered in response to pivotal movement of the lower ends of said interconnected legs away from one another.

10. The motorcycle jack of claim 9 wherein the pair of legs mounted on the cross shaft in the lower of the two generally horizontal planes, are of a length adapted to maintain said frame means in a generally horizonal plane as all four legs are moved to raise said frame means.

* * * * *